US006944974B2

(12) United States Patent
Falone et al.

(10) Patent No.: US 6,944,974 B2
(45) Date of Patent: Sep. 20, 2005

(54) SHOE INSERT FORMED OF REINFORCED ELASTOMER FOR REGULATING AND DAMPENING VIBRATION

(75) Inventors: Thomas Falone, Mickelton, NJ (US); Carmen Dimario, West Chester, PA (US); Robert A. Vito, Berwyn, PA (US)

(73) Assignee: Sting Free Company, Berwyn, PA (US)

( * ) Notice: Subject to any disclaimer, the term of this patent is extended or adjusted under 35 U.S.C. 154(b) by 26 days.

(21) Appl. No.: 10/982,819

(22) Filed: Nov. 5, 2004

(65) Prior Publication Data

US 2005/0060911 A1 Mar. 24, 2005

Related U.S. Application Data

(63) Continuation of application No. 09/978,130, filed on Oct. 16, 2001, now Pat. No. 6,880,269.

(51) Int. Cl.[7] .................... A43B 13/38
(52) U.S. Cl. .................... 36/44; 36/30 R
(58) Field of Search .................... 36/44, 43, 153, 36/154, 30 R

(56) References Cited

U.S. PATENT DOCUMENTS

| | | | |
|---|---|---|---|
| 1,125,029 | A | 1/1915 | Lard |
| 1,195,994 | A | 8/1916 | Lard |
| 1,498,838 | A | 6/1924 | Harrison, Jr. |
| 1,551,203 | A | 8/1925 | Mills |
| 1,620,118 | A | 3/1927 | Mattern |
| 1,701,856 | A | 2/1929 | Kraeuter |
| 2,023,131 | A | 12/1935 | Gibson |
| 2,099,521 | A | 11/1937 | Herkimer et al. |
| 2,871,899 | A | 2/1959 | Coyle et al. |
| 3,353,981 | A | 11/1967 | Jacob |
| 3,606,326 | A | 9/1971 | Sparks et al. |
| 3,716,433 | A | 2/1973 | Plummer |
| 3,779,551 | A | 12/1973 | Wilson |
| 4,015,851 | A | 4/1977 | Pennell |
| 4,044,625 | A | 8/1977 | D'Haem et al. |
| 4,134,198 | A | 1/1979 | Briggs |
| 4,143,109 | A | 3/1979 | Stockum |
| 4,147,443 | A | 4/1979 | Skobel |
| 4,197,611 | A | 4/1980 | Bell et al. |
| 4,261,567 | A | 4/1981 | Uffindell |
| 4,268,574 | A | 5/1981 | Peccenini et al. |
| 4,338,270 | A | 7/1982 | Uffindell |
| 4,347,280 | A | 8/1982 | Lau et al. |
| 4,417,042 | A | 11/1983 | Dziark |
| 4,483,972 | A | 11/1984 | Mitchell |
| 4,552,713 | A | 11/1985 | Cavicchioli |
| 4,591,160 | A | 5/1986 | Piragino |
| 4,597,578 | A | 7/1986 | Lancaster |
| 4,613,537 | A | 9/1986 | Krupper |
| 4,660,832 | A | 4/1987 | Shomo |
| 4,736,949 | A | 4/1988 | Muroi |
| 4,819,939 | A | 4/1989 | Kobayashi |
| 4,864,738 | A | 9/1989 | Horovitz |
| 4,912,836 | A | 4/1990 | Avetoom |
| 4,919,420 | A | 4/1990 | Sato |
| 4,948,131 | A | 8/1990 | Nakanishi |
| 4,953,862 | A | 9/1990 | Uke et al. |
| 4,983,242 | A | 1/1991 | Reed |
| 4,989,643 | A | 2/1991 | Walton et al. |

(Continued)

*Primary Examiner*—Ted Kavanaugh
(74) *Attorney, Agent, or Firm*—Volpe and Koenig, P.C.

(57) ABSTRACT

An article of athletic clothing is provided with at least one sting reducing multilayer laminate pad. Preferably the laminate pad comprises an inner layer made of vibration damping material such as an elastomeric material and preferably silicone gel. The pad also includes a layer of force dissipating stiffening material as an intermediate layer located outwardly of the inner layer of vibration damping material. The pad also includes an outermost cover layer.

22 Claims, 3 Drawing Sheets

U.S. PATENT DOCUMENTS

| | | | |
|---|---|---|---|
| 5,005,254 | A | 4/1991 | Uffindell |
| 5,042,804 | A | 8/1991 | Uke et al. |
| 5,083,780 | A | 1/1992 | Walton et al. |
| 5,088,734 | A | 2/1992 | Glava |
| 5,110,653 | A | 5/1992 | Landi |
| 5,122,405 | A | 6/1992 | Landi |
| 5,137,769 | A | 8/1992 | Landi |
| 5,193,246 | A | 3/1993 | Huang |
| 5,199,706 | A | 4/1993 | Chen |
| 5,203,561 | A | 4/1993 | Lanctot |
| 5,240,247 | A | 8/1993 | Didier |
| 5,254,391 | A | 10/1993 | Davis |
| 5,258,088 | A | 11/1993 | Wu |
| 5,261,665 | A | 11/1993 | Downey |
| 5,267,487 | A | 12/1993 | Falco et al. |
| 5,269,516 | A | 12/1993 | Janes |
| 5,282,618 | A | 2/1994 | Hong |
| 5,290,036 | A | 3/1994 | Fenton et al. |
| 5,294,119 | A | 3/1994 | Vincent et al. |
| 5,322,280 | A | 6/1994 | Wu |
| 5,322,285 | A | 6/1994 | Turner |
| 5,322,290 | A | 6/1994 | Minami |
| 5,333,861 | A | 8/1994 | Mills |
| 5,338,600 | A | 8/1994 | Fitchmun et al. |
| 5,348,303 | A | 9/1994 | Swissheim |
| 5,355,552 | A | 10/1994 | Huang |
| 5,362,046 | A | 11/1994 | Sims |
| 5,377,979 | A | 1/1995 | Long |
| 5,384,083 | A | 1/1995 | Dawn et al. |
| 5,395,108 | A | 3/1995 | Souders et al. |
| 5,435,549 | A | 7/1995 | Chen |
| 5,463,824 | A | 11/1995 | Barna |
| 5,511,777 | A | 4/1996 | McNeely |
| 5,516,101 | A | 5/1996 | Peng |
| 5,524,885 | A | 6/1996 | Heo |
| 5,528,842 | A | 6/1996 | Ricci et al. |
| 5,547,189 | A | 8/1996 | Billings |
| 5,575,473 | A | 11/1996 | Turner |
| 5,593,158 | A | 1/1997 | Filice et al. |
| 5,621,914 | A | 4/1997 | Ramone et al. |
| 5,624,114 | A | 4/1997 | Kelsey |
| D379,208 | S | 5/1997 | Kulisek, Jr. |
| 5,636,377 | A | 6/1997 | Wiener |
| 5,653,643 | A | 8/1997 | Falone et al. |
| 5,655,975 | A | 8/1997 | Nashif |
| 5,657,985 | A | 8/1997 | Dahlstrom et al. |
| 5,673,437 | A | 10/1997 | Chase et al. |
| 5,686,158 | A | 11/1997 | Gibbon |
| 5,695,408 | A | 12/1997 | DeLaCruz |
| 5,730,662 | A | 3/1998 | Rens |
| 5,749,798 | A | 5/1998 | Kuebler et al. |
| 5,759,113 | A | 6/1998 | Lai et al. |
| 5,772,524 | A | 6/1998 | Huang |
| 5,789,327 | A | 8/1998 | Rousseau |
| 5,840,397 | A | 11/1998 | Landi et al. |
| 5,842,933 | A | 12/1998 | Lewis |
| 5,843,851 | A | 12/1998 | Cochran |
| 5,858,521 | A | 1/1999 | Okuda et al. |
| 5,912,195 | A | 6/1999 | Walla et al. |
| 5,916,664 | A | 6/1999 | Rudy |
| 5,926,847 | A | 7/1999 | Eibert |
| 5,944,617 | A | 8/1999 | Falone et al. |
| 5,946,734 | A | 9/1999 | Vogan |
| 5,963,989 | A | 10/1999 | Robertson |
| 5,979,081 | A | 11/1999 | Vaz |
| 6,000,062 | A | 12/1999 | Trakh |
| 6,007,439 | A | 12/1999 | MacKay, Jr. |
| 6,077,793 | A | 6/2000 | Hatjasalo et al. |
| 6,216,276 | B1 | 4/2001 | Eibert |
| 6,219,940 | B1 | 4/2001 | Kita |
| 6,231,946 | B1 | 5/2001 | Brown, Jr. et al. |
| 6,368,989 | B1 | 4/2002 | Pascual et al. |
| 6,416,432 | B1 | 7/2002 | Rosen et al. |
| 6,558,270 | B2 | 5/2003 | Kwitek |
| 2001/0055994 | A1 | 12/2001 | Kwitek |

SHOE INSERT FORMED OF REINFORCED ELASTOMER FOR REGULATING AND DAMPENING VIBRATION

BACKGROUND OF THE INVENTION

When individuals participate in various athletic activities it is common that parts of the individual's body are subject to impact. Various attempts have been made through the years to provide padding as a means of protecting the participants. Such padding is well known for various organized sports as well as for individual athletic activities such as biking, skating, golfing, etc. The main thrust in the use of such padding is to provide a sufficiently thick layer of padding material to cushion any impact. Such approaches, however, do not take into account the problems and discomfort that result from the sting produced by such impact.

SUMMARY OF THE INVENTION

An object of this invention is to provide a sting reduction padding for various articles of athletic clothing.

In accordance with this invention a sting reducing laminate pad is provided which includes a layer of vibration damping material that would preferably be located toward the user's body. A further layer of force dissipating stiffening material would preferably be located against and outwardly of the vibration damping layer. An outer cover layer would be located outwardly of the intermediate layer.

In a preferred practice of this invention the vibration damping material is a gel material such as a silicon gel. The layer of force dissipating stiffening material is preferably an aramid material. The outer cover layer could be made of any suitable material including a vibration-damping gel.

The sting reducing pad could be provided on various articles of athletic clothing such as bands, gloves, hats/helmets and various other conventional pads.

THE DRAWINGS

DETAILED DESCRIPTION

The present invention is directed to sting reducing padding which would be incorporated in an article of athletic clothing. In general, the padding comprises a laminate of at least two layers. One layer is made of vibration damping or vibration absorbing material which could be of the type disclosed in U.S. Pat. Nos. 5,653,643 and 5,944,619, as well as co-pending application Ser. No. 09/939,319, all of the details of these patents and the application are fully incorporated herein by reference thereto. Another layer of the sting reducing pad is made of force dissipating stiffening material which could be an aramid material such as Kevlar®. In the preferred practice of the invention the vibration damping material is located innermost so as to be closest to the user's body. Preferably, a cover layer is provided as the outermost layer of the laminate pad with the force dissipating stiffening layer being an intermediate layer.

Figure 1:
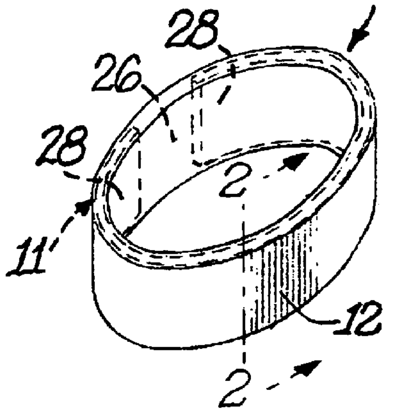
FIG. 1 is a perspective view of a headband in accordance with this invention.
Figure 2:
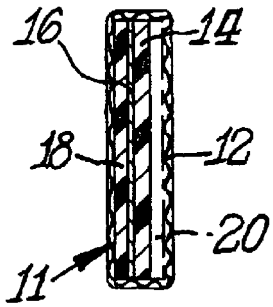
FIG. 2 is a cross-sectional view taken through FIG. 1 along the line 2—2.

FIGS. 1–2 show one practice of the invention. As illustrated therein, a headband 10 is the article of athletic clothing. Headband 10 would have a peripheral outer fabric layer 12 forming a hollow envelope with the sting reducing pad 11 located within the fabric layer. The sting reducing pad 11 includes an inner layer 14 made of vibration damping material with a very thin intermediate layer 16 made of force dissipating stiffening material. In the embodiment shown in FIG. 2 an outer cover layer 18 is also provided which could be of any suitable material. A preferred material for outer layer 18 is also a vibration damping material. If desired, the laminate could include more than the three illustrated layers. Thus, FIG. 2 shows a space 20 to schematically represent one or more additional layers. Such additional layers could be further force dissipating layers and/or further vibration damping layers or layers provided for any other purpose such as foam layers to provide a cushioning member.

As described in copending application Ser. No. 09/939,319 the vibration damping material of layer 14 could be a silicone gel such as used for caulking purposes or any other suitable gel such as a foamed gel. The material could have the appropriate hardness and vibration damping characteristics to function in cooperation with the other layers of the laminate to provide the desired sting reduction.

The intermediate layer 16 functions as a stiffening layer which dissipates the forces from impact if the user should fall or be struck by an object. The intermediate layer 16 could achieve its functions while being relatively thin as compared to the thicker vibration damping layer 14 and could also be substantially thinner than the outer cover layer 18. The intermediate layer 16 apparently functions to longitudinally spread the vibration resulting from impact forces. The linear spread of the vibration causes a rebound effect which dampens the vibration.

Figure 3:
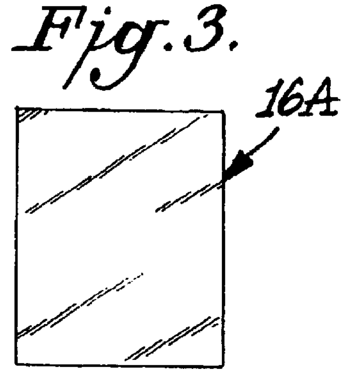
FIGS. 3–6 are plan views of various forms of force dissipating layers which can be used in the practices of this invention.
Figure 4:
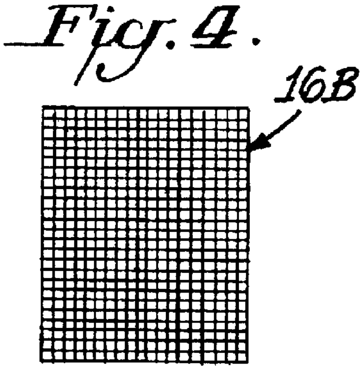
Figure 5:
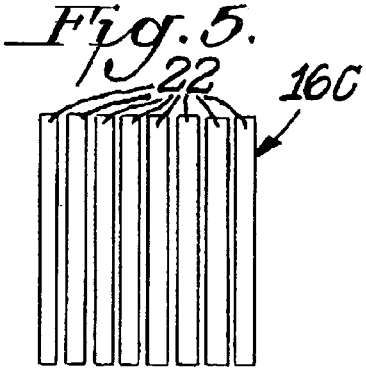
Figure 6:
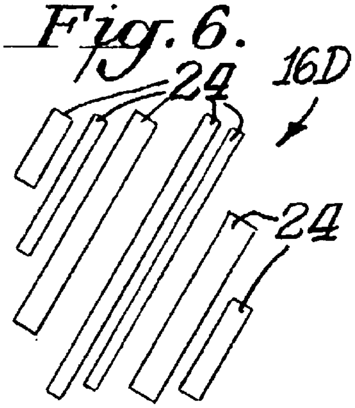

FIGS. 3–6 show various possible forms that the intermediate force dissipating layer 16 can take. As shown in FIG. 3 the force dissipating stiffening layer 16A is in the form of a generally imperforate sheet. FIG. 4 illustrates a force dissipating layer 16B to be in the form of a scrim or an open mesh sheet made from, for example, Kevlar® fibers. FIG. 5 illustrates a variation where the force dissipating layer 16C is formed of a plurality of individual strips 22 which are parallel to each other and generally identical to each other in length and thickness as well as spacing. FIG. 6 shows a variation where the force dissipating layer 16D is made of individual strips 24 of different sizes and which could be disposed in a more random fashion regarding their orientation. Although all of the strips 24 are illustrated in FIG. 6 as being parallel, non-parallel arrangements could also be used.

The effect of a laminate in accordance with this invention as regards sting reduction is described in co-pending application Ser. No. 09/939,319 with regard to tests performed on baseball bats. Such laboratory tests were carried out at a prominent university to evaluate various grips mounted on baseball bats. In the testing, baseball bats with various grips were suspended from the ceiling by a thin thread; this achieves almost a free boundary condition that is needed to determine the true characteristics of the bats. Two standard industrial accelerometers were mounted on a specially fabricated sleeve roughly in positions where the left hand and the right hand would grip the bat. A known force was delivered to the bat with a standard calibrated impact hammer at three positions, one corresponding to the sweet spot, the other two simulating. "miss hits" located on the mid-point and shaft of the bat. The time history of the force as well as the accelerations were routed through a signal conditioning device and were connected to a data acquisition device. This was connected to a computer which was used to log the data.

Two series of tests were conducted. In the first test, a control bat (with a standard rubber grip, WORTH Bat—model #C405) was compared to identical bats with several "Sting-Free" grips representing practices of the invention. These "Sting-Free" grips were comprised of two layers of pure silicone with various types of Kevlar® inserted between the two layers of silicone. The types of Kevlar® used in this test were referenced as follows: "005", "645", "120", "909". Also, a bat with just a thick layer of silicone but no Kevlar® was tested. With the exception of the thick silicone (which was deemed impractical because of the excessive thickness), the "645" bat showed the best reduction in vibration magnitudes.

The second series of tests were conducted using EASTON Bats (model #BK8) with the "645" Kevlar® in different combinations with silicone layers: The first bat tested was comprised of one bottom layer of silicone with a middle layer of the "645" Kevlar® and one top layer of silicone referred to as "111". The second bat test was comprised of two bottom layers of silicone with a middle layer of Kevlar® and one top layer of silicone referred to as "211". The third bat tested was comprised of one bottom layer of silicone with a middle layer of Kevlar® and two top layers of silicone referred to as "112". The "645" bat with the "111" configuration showed the best reduction in vibration magnitudes.

In order to quantify the effect of this vibration reduction, two criteria were defined: (I) the time it takes for the vibration to dissipate to an imperceptible value; and (2) the magnitude of vibration in the range of frequencies at which the human hand is most sensitive.

The sting-free grips reduced the vibration in the baseball bats by both quantitative measures. In particular, the "645" Kevlar® in a "111" configuration was the best in vibration reduction. In the case of a baseball bat, the "645" reduced the bat*s vibration in about ⅕ the time it took the control rubber grip to do so. The reduction in peak magnitude of vibration ranged from 60% to 80%, depending on the impact location and magnitude.

It was concluded that the "645" Kevlar® grip in a "111" combination reduces the magnitude of sensible vibration by 80% that is induced in a baseball bat when a player hits a ball with it. This was found to be true for a variety of impacts at different locations along the length of the bat. Hence, a person using the "Sting-Free" grips of the invention would clearly experience a considerable reduction in the sting effect (pain) when using the "sting-free" grip than one would with a standard grip.

In view of the above tests a particularly preferred practice of the invention involves a multilayer laminate having an aramid such as Kevlar®, sandwiched between layers of pure silicone. The above indicated tests show dramatic results with this embodiment of the invention. As also indicated above, however, the laminate could comprise other combinations of layers such as a plurality of inner layers of silicone or a plurality of outer layers of silicone. Other variations include a repetitive laminate assembly wherein a vibration damping layer is innermost with a force dissipating layer against the inner vibration damping layer and then with a second vibration damping layer against the force dissipating layer followed by a second force dissipating layer, etc. with the final laminate layer being a cover layer which could also be made of vibration damping material. Among the considerations in determining which laminate should be used would be the thickness limitations and the desired vibration damping properties.

The various layers could have different relative thicknesses. Preferably, the vibration damping layer, such as layer 14, would be the thickest of the layers. The outermost cover layer, however, could be of the same thickness as the vibration damping layer, such as layer 18 shown in FIG. 2 or could be a thinner layer. A particularly advantageous feature of the invention where a force dissipating stiffening layer is used is that the force dissipating layer could be very thin and still achieve its intended results. Thus, the force dissipating layer would preferably be the thinnest of the layers, although it might be of generally the same thickness as the outer cover layer. If desired the laminate could also include a plurality of vibration damping layers (such as thin layers of gel material) and/or a plurality of stiffening force dissipating layers. Where such plural layers are used, the various layers could differ in the thickness from each other.

In a preferred practice of the invention, a force dissipating stiffening layer is provided as an intermediate layer of a multilayer laminate where there is at least one inner layer of vibration damping material and an outer layer of cover material with the possibility of additional layers of vibration damping material and force dissipating layers of various thickness. As noted the force dissipating layer, however, could be innermost. The invention may also be practiced where the laminate includes one or more layers in addition to the cover layer and the stiffening layer and the vibration damping layer. Such additional layer(s) could be incorporated at any location in the laminate, depending on its intended function (e.g., an adhesive layer, a cushioning layer, a low friction layer, etc.).

A preferred practice of this invention is to incorporate a force dissipating layer, particularly an aramid, such as Kevlar® fiber, or a suitable fiberglass material, into a composite with at least two elastomer layers. One elastomer layer would function as a vibration damping material and the other outer elastomer layer which would function as a cover layer. The outer elastomer layer could also be a vibration damping material. Preferably, the outer layer completely covers the composite.

There are an almost infinite number of possible uses for the composite or laminate of this invention. In accordance with the various uses the elastomer layers may have different degrees of hardness, coefficient of friction and damping of vibration. Similarly, the thicknesses of the various layers could also vary in accordance with the intended use. Examples of ranges of hardness for the inner vibration damping layer and the outer cover layer (which may also be a vibration absorbing layer) are 5–70 Durometer Shore A. One of the layers may have a range of 5–20 Durometer. Shore A and the other a range of 30–70 Durometer Shore A for either of these layers. The vibration damping layer could have a hardness of less than 5, and could even be a 000 Durometer reading. The vibration damping material could be a gel, such as a silicone gel or a gel of any other suitable material. The coefficient of friction as determined by conventional measuring techniques for the tacky and non-porous outer cover layer is preferably at least 0.5 and may be in the range of 0.6–1.5. A more preferred range is 0.7–1.2 with a still more preferred range being about 0.8–1. The outer cover layer, when also used as a vibration damping layer, could have the same thickness as the inner layer. When used solely as a cover layer the thickness could be generally the same as the intermediate layer, which might be about 1/20 to 1/4 of the thickness of the vibration damping layer.

The sting reducing pad 11 of this invention could be incorporated in various articles of athletic clothing and could be incorporated in various manners within a particular article of clothing. FIG. 1, for example, illustrates the headband 10 to have the pad or laminate 11 be in the form of a strip wherein a gap 26 is left between the free ends 28,28 of the laminate 11. The gap 26 would permit the headband 10 to be adjustable in circumference for snugly and comfortably fitting on the user's head by providing an open area for expansion and contraction to conform to the size of the particular user. If desired, the laminate 11 could be in the form of spaced pads located at different spaced locations within the fabric cover 12. For example, it might be sufficient to provide the laminate 11 solely in the temple areas and/or in the forehead area of the headband.

While the outer cover layer 18 could be made of a material similar to the vibration damping material of layer 14, in various practices of the invention the outer cover layer could be made of a low friction slippery material to facilitate inserting the pad 11 into proper position on the article of athletic clothing. If desired, a thin slippery layer could also be provided as the innermost layer so that the pad 11 would have slippery layers on both sides and could be easily inserted into and moved when necessary within the outer fabric 12 of headband 10. Thus, the layer 20 illustrated in FIG. 2 may incorporate a further layer having low friction characteristics.

While FIG. 1 illustrates the practice of the invention in a headband 10, it is also to be understood that essentially the same structure could be used for other forms of bands such as worn on the wrist, legs and arms. A particular advantage of incorporating the laminate 11 in a band, such as headband 10, is that it would lend itself to more ready acceptance by users, particularly children who would prefer to avoid wearing large cumbersome protective equipment or padding.

Although FIG. 1 shows the headband 10 to be a continuous endless flexible loop, it is to be understood that the invention could be incorporated in a headband or visor where the headband or visor does not extend completely around the head 360°. Instead the headband or visor could be made of a stiff springy material having a pair of spaced free ends.

Figure 7:
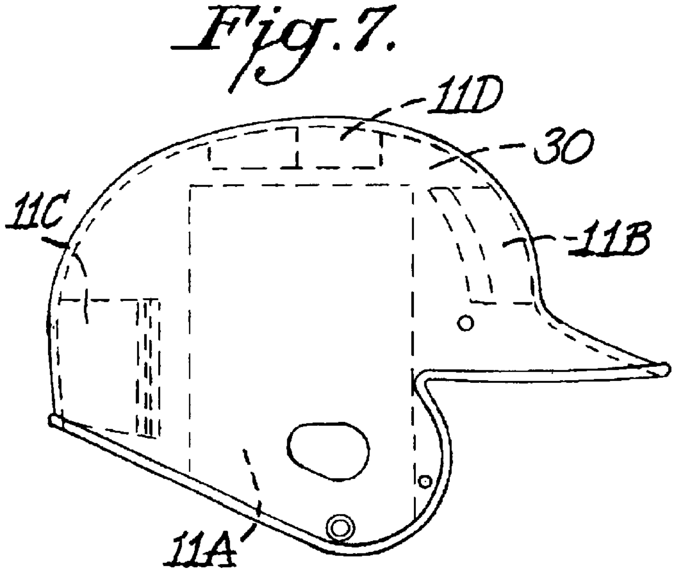
FIG. 7 is a side elevational view showing sting reducing pads in accordance with this invention incorporated in a batting helmet.
Figure 8:
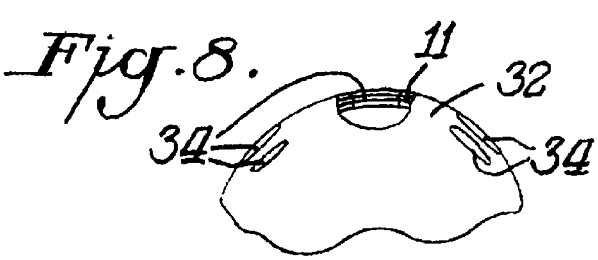
FIG. 8 is a side elevational view partly broken away showing the practice of the invention in the helmet of a cyclist.

FIGS. 7–8 illustrate the incorporation of various sting reducing pads in different types of headwear. FIG. 7, for example, shows a baseball batting helmet 30 having a plurality of pads 11 mounted to different portions of the inner surface of helmet 30. These include pads 11A which would be located generally at the temple and ears on each side of the helmet 30. A forehead pad 11B is located above the brim of helmet 30. A neck pad 11C is located opposite the brim and a top pad 11D is located at the top of the helmet 30 at its inner surface. Each of these pads could be suitably dimensioned for providing the desired sting reduction characteristics.

FIG. 8 illustrates a cyclist helmet 32 wherein a pad 11 is located on the inner surface of helmet 32. The pad 11 could be provided in a plurality of segments at different locations of the inner surface or could be a single pad covering substantially the entire inner surface. In such later case, however, it would be preferable for the pad 11 to include cutouts aligned with the air circulation openings 34 of helmet 32.

FIGS. 7–8 are included merely to exemplify different forms of headwear which could include sting reducing pads. It is to be understood that the invention may be practiced with other types of caps, helmets or headwear such as football helmets, hockey helmets, baseball caps, golfer's caps and the like. Thus the pad could be a liner for a hard helmet or shell or for a soft cap. The pad could be in a sweatband/headband such as for a soccer player. Thus, when the player uses the head to strike the soccer ball the sting from the impact would be minimized.

Figure 9:
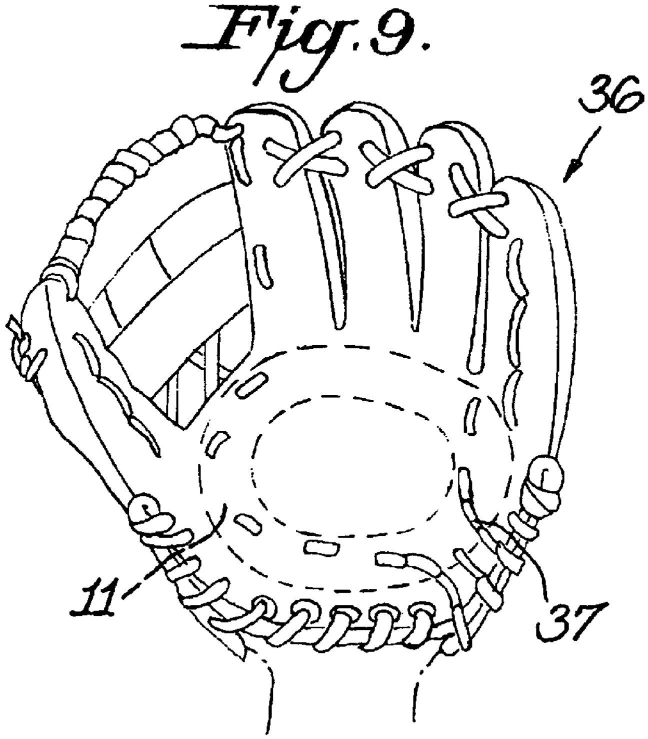
FIG. 9 is a front elevational view showing the practice of the invention in a baseball fielder's glove.
Figure 10:
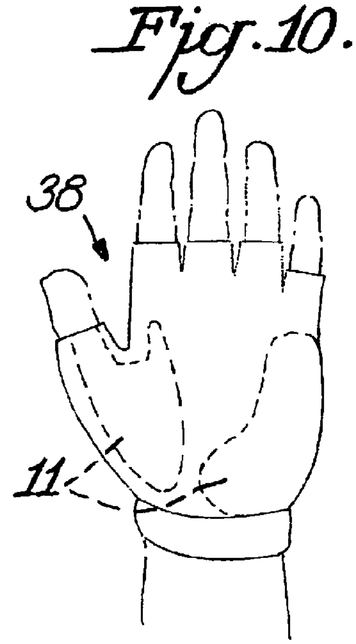
FIG. 10 is a front elevational view-showing the practice of the invention in an athlete's glove.

FIGS. 9–10 illustrate practices of the invention wherein the sting reducing laminate padding is used in various handwear. FIG. 9, for example, shows a baseball fielder's glove 36 which could be of generally conventional construction and could include padding, but would also include a pad 11 in the palm section preferably located directly against the outer leather layer of the glove where the ball would be caught. While the pad 11 may cover the entire palm area, it is preferred that pad 11 be ring shaped as illustrated in FIG. 9 so as to leave the central portion of the palm area thinner thereby giving the user a better feel for the ball.

The laminate could also be included in other types of baseball gloves, such as catcher's mitts or first baseman's mitts. When the pad 11 is used in a catcher's mitt there would be the additional benefit of utilizing a pad such as pad 11 in that the pad could be made relatively thin thereby not interfering with the feel in the catcher's use of the mitt.

The pads 11 may be incorporated in the gloves and in the other articles of athletic clothing in any suitable manner. FIG. 9, for example, shows the pad 11 secured to the glove 36 by lacing 37. Other forms of attachment could include stitching or adhesive attachments. The tackiness of an outer silicone gel layer in the pad could also be utilized to secure the pad in place.

FIG. 10 illustrates an athletic glove 38 which incorporates one or more sting reducing pads 11. Athletic glove 38 may be of the type used by a cyclist wherein the glove is fingerless or at least exposes enough of the fingers to still permit the user's hands to properly grasp the handlebars. The glove is usually thin and usually not thickly padded. As illustrated in FIG. 10 the pads 11,11 are located over the ulnar and median nerves.

Other forms of athletic gloves which could incorporate sting reducing pads of this invention could be the types of gloves worn by golfers, football players, baseball batters and the like. Sting reducing pads could also be used for otherwise ordinary gloves worn for warmth or various covering purposes, such as in shoveling or in the use of tools, such as jack hammers. Further types of athletic gloves which may incorporate the sting reducing pads could include other types of handwear worn for other types of activities.

Figure 11:
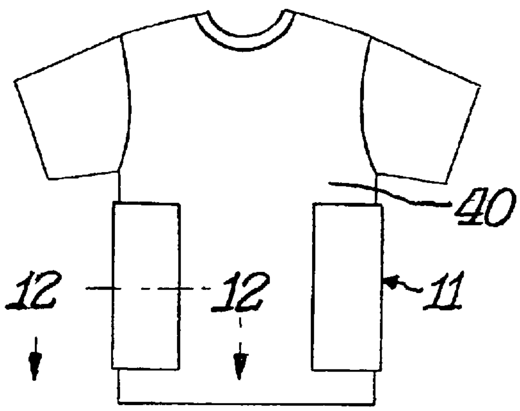
FIG. 11 is a front elevational view showing the practice of the invention in a shirt or jersey.
Figure 12:
FIG. 12 is a cross-sectional view taken through FIG. 11 along the line 12—12.

The sting reducing pads could be incorporated in other types of equipment such as articles of clothing worn by athletes, particularly by being incorporated in the jerseys or shirts of an athlete such as a soccer player or football player. FIGS. 11–12 show a unique incorporation of the sting reducing pad 11 in a shirt or jersey 40 wherein a layer of the jersey 40 itself forms part of the laminate. Thus, as shown therein, the pad 11 includes an inner layer 14 which would be disposed toward the user's body with the intermediate force dissipating layer 16 secured to the fabric of jersey 40. An outer layer 18 is located directly against jersey 40 in line with layers 14 and 16. Where outer cover layer 18 is made of a tacky material such as a silicone gel which could be used as a further vibration damping material. The portion of the jersey 40 incorporating the laminate 18 would thereby be somewhat tacky. This could have an advantage in various sports, such as for a soccer goalie or a football receiver. The tackiness created on the outer surface of jersey 40 (as a result of layer 18) could tend to prevent a ball from bouncing off the jersey and thus facilitate the wearer of the jersey better grasping the ball.

When incorporated in a shirt or jersey article of clothing the sting reducing pad 11 could be placed at any desired location. Preferably, however, the pad is located in the rib area as illustrated in FIG. 11.

Although FIGS. 11–12 show the pad 11 as comprising a multi-laminate wherein one of the layers of the laminate is the jersey 40 itself, it is to be understood that the invention could be practiced where the pad is simply secured to the jersey either on the outside or inside of the jersey without incorporating the jersey itself as a layer of the pad. When used on the inside of the jersey it would not be necessary to have an outer layer made of tacky material unless such is desired for the vibration damping characteristics of the layer.

Figure 13:
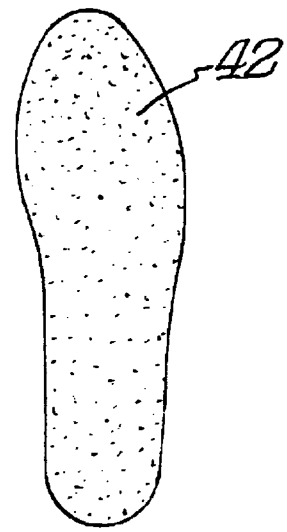
FIG. 13 is a top plan view showing the practice of the invention in a shoe pad.

FIG. 13 illustrates yet another variation of the invention wherein the sting reducing pad would be incorporated as part of a pad 42 incorporated within or comprising the entire inner sole to be worn inside a shoe, sneaker, skate or other footwear. Where used as a footwear insert, the pad could be above the sole and heel portion so that the foot would be on and against the pad.

The invention could also be practiced where the sting reducing pad is incorporated in footwear at locations other than directly below the foot. For example, the sting reducing pad could be placed as part of the footwear itself above the sole along the sides and/or front and/or heel and/or top of the footwear to protect other parts of the foot. Thus, when incorporated in a hockey skate, pad 11 would reduce sting from the player's skate being hit by a puck. Pad 11 would also reduce sting from a ball being fouled off a baseball batter's foot or from other athletes being stepped on such as from spikes or cleats or simply being stepped on or hit, etc.

Figure 14:
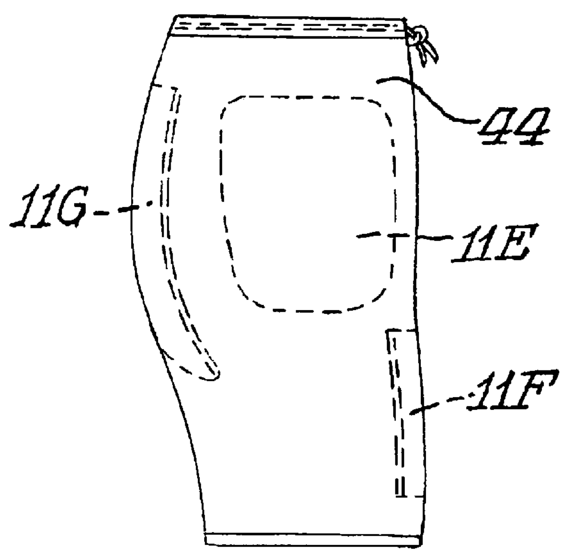
FIG. 14 is a side elevational view showing practices of the invention at various portions of a pair of pants.

FIG. 14 is included to exemplify the practices of the invention wherein the sting reducing laminate pad could be incorporated as part of various conventional pads used for many different athletic activities. As shown therein, a pair of athletic pants 44 is illustrated as incorporating a plurality of sting reducing pads 11E, 11F and 11G. Pad 11E could be mounted to a hip pad wherein the laminate is secured, for example, to the inside surface of the pad so as to be disposed toward the body of the user. Pad 11F is mounted to a thigh pad, while pad 11G is mounted to a buttocks pad. Other possible protective pads that could include the sting reducing laminate are shoulder pads, shin pads, knee pads, chest protectors, elbow pads, etc. Alternatively, the laminate 11 could itself be the actual pad.

The pads could be incorporated as part of a soft structure, such as gloves, headbands, etc. or parts of a hard structure such as batting helmets, motorcycle helmets, football helmets, etc. Preferably, the pad comprises at least three layers with the vibration damping layer innermost and with the force dissipating stiffening layer as an intermediate layer. In the preferred practice of the invention the force dissipating layer should have a layer on each side thereof so as to maximize the force dissipation. The pad could be located so as to be where there would likely be the contact or impact on the user. The pad could be an insert in the article of clothing where a fabric layer or other normal layer in an article of clothing is disposed against the body of the user and with the article of clothing having an outer layer so that the pad is between the inner and outer layers of the article of clothing. Alternatively, the pad could be mounted directly to the outside surface of the article of clothing or directly to the inside surface.

While the invention has been described with regard to particular types of articles of athletic clothing, such specific examples are not intended to be limiting. Broadly, the invention could be used with such articles of clothing in groups of different types, namely: (1) different bands such as headbands, wristbands, arm bands, etc.; (2) different types of headwear such as hats, caps and helmets; (3) different types of handwear such as gloves, mitts; (4) various body pads such as shoulder pads, hip pads, shin pads, etc.; (5) with footwear such as part of or being an insert for a sneaker, skate, or shoe and (6) as part of a shirt or pants.

What is claimed is:

1. A shoe insert formed from a reinforced elastomer material that regulates and dissipates vibration, the shoe insert comprising:

an insert body having a generally elongated shape with an outer perimeter configured to substantially conform to a sole of a shoe so that the insert body extends along an inner surface of the shoe from a location proximate to a heel of the shoe to a toe of the shoe, the insert body being generally planar and formed by the reinforced elastomer material that regulates and dissipates vibration, the reinforced elastomer material comprising:

first and second thermoset elastomer layers; and a reinforcement layer disposed between and generally separating the first and second thermoset elastomer layers, the reinforcement layer comprising a layer of aramid material, the reinforcement layer being generally coextensive with the first and second thermoset elastomer layers such that the reinforcement layer extends generally throughout the entire area of the insert body as bounded by the perimeter of the insert body.

2. The shoe insert of claim 1, wherein the layer of aramid material of the reinforcement layer prevents elongation of the shoe insert during use.

3. The shoe insert of claim 1, wherein the aramid material is a woven sheet.

4. The shoe insert of claim 1, wherein the first and second elastomer layers are formed by silocone material.

5. The shoe insert of claim 1, wherein the aramid material is formed by a plurality of individual strips of aramid material.

6. The shoe insert of claim 5, wherein the individual strips are generally parallel to each other.

7. The shoe insert of claim 6, wherein at least some of the individual strips have different sizes.

8. The shoe insert of claim 7, wherein the first and second elastomer layers are formed of a thermoset silicone material.

9. A shoe insert formed from composite material that regulates vibration, the composite material having three generally independent and separate layers, the shoe insert comprising:

an insert body having a generally elongated shape with an outer perimeter configured to substantially conform to a sole of a shoe so that the insert body extends along an inner surface of the shoe from a location proximate to a heel of the shoe to a toe of the shoe, the insert body being generally planar and formed by the composite material that regulates and dissipates vibration, the composite material comprising:

first and second elastomer layers; and a reinforcement layer disposed between and generally separating the first and second elastomer layers, the reinforcement layer comprising a layer of fiberglass material, the reinforcement layer being coextensive with the first and second elastomer layers such that the reinforcement layer extends generally throughout the entire area of the insert body as bounded by the outer perimeter of the insert body.

10. The shoe insert of claim 9, wherein the layer of fiberglass material is formed by individual strips that are generally parallel to each other.

11. The shoe insert of claim 10, wherein at least some of the individual strips have different sizes.

12. The shoe insert of claim 9, wherein the layer of fiberglass of the reinforcement layer substantially prevents elongation of the shoe insert during use.

13. The shoe insert of claim 9, wherein the reinforcement layer generally separates the first and second elastomer layers causing the material to have three generally distinct and separate layers.

14. The shoe insert of claim 9, wherein the first and second elastomer layers are formed of a thermoset silicone material.

15. A shoe insert formed from a reinforced elastomer material that regulates and dissipates vibration, the shoe insert comprising:

an insert body having a generally elongated shape with an outer perimeter configured to substantially conform to a sole of a shoe so that the insert body extends along an inner surface of the shoe from a location proximate to a heel of the shoe to a toe of the shoe, the insert body being generally planar and formed by the reinforced elastomer material that regulates and dissipates vibration, the reinforced elastomer material comprising:

first and second thermoset elastomer layers; and a reinforcement layer disposed between and generally separating the first and second thermoset elastomer layers, the reinforcement layer comprising a layer of high tensile strength fibrous material, the reinforcement layer being generally coextensive with the first and second thermoset elastomer layers such that the reinforcement layer extends generally throughout the entire area of the insert body as bounded by the outer perimeter of the insert body.

16. The shoe insert of claim 15, wherein the high tensile strength fibrous material of the reinforcement layer substantially prevents elongation of the shoe insert during use.

17. The shoe insert of claim 15, wherein the high tensile strength fibrous material is a woven sheet.

18. The shoe insert of claim 17, wherein the woven sheet generally separates the first and second elastomer layers causing the material to have three generally distinct and separate layers.

19. The shoe insert of claim 15, the reinforcement layer consisting of the high tensile strength fibrous material formed by a plurality of individual strips.

20. The shoe insert of claim 19, wherein the individual strips are general parallel to each other.

21. The shoe insert of claim 20, wherein at least some of the individual strips have different sizes.

22. The shoe insert of claim 15, wherein the first and second elastomer layers are formed of thermoset silicone material.

* * * * *